United States Patent
Mikhemar et al.

(10) Patent No.: US 8,208,866 B2
(45) Date of Patent: Jun. 26, 2012

(54) RF TRANSCEIVER FRONT-END WITH RX/TX ISOLATION

(75) Inventors: Mohyee Mikhemar, Irvine, CA (US); Hooman Darabi, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 713 days.

(21) Appl. No.: 12/363,486

(22) Filed: Jan. 30, 2009

(65) Prior Publication Data

US 2010/0035563 A1 Feb. 11, 2010

Related U.S. Application Data

(60) Provisional application No. 61/086,294, filed on Aug. 5, 2008.

(51) Int. Cl.
*H04B 1/40* (2006.01)
*H04B 1/44* (2006.01)
*H04B 1/46* (2006.01)
*H04M 1/00* (2006.01)

(52) U.S. Cl. ............ 455/77; 455/78; 455/80; 455/550.1

(58) Field of Classification Search .................... 455/73, 455/77, 78, 80, 82, 550.1, 560
See application file for complete search history.

(56) References Cited

U.S. PATENT DOCUMENTS

| | | | | |
|---|---|---|---|---|
| 5,333,194 A * | 7/1994 | Caesar | ............ | 379/402 |
| 5,574,749 A * | 11/1996 | Nelson et al. | ............ | 375/220 |
| 7,253,702 B2 * | 8/2007 | Kemmochi et al. | ............ | 333/133 |
| 7,515,879 B2 * | 4/2009 | Okabe et al. | ............ | 455/73 |
| 7,801,493 B2 * | 9/2010 | Do | ............ | 455/83 |
| 8,022,787 B2 * | 9/2011 | Inoue et al. | ............ | 333/110 |
| 2002/0049043 A1 * | 4/2002 | Gamliel | ............ | 455/112 |
| 2004/0192230 A1 * | 9/2004 | Franca-Neto | ............ | 455/101 |
| 2005/0180332 A1 * | 8/2005 | Kim et al. | ............ | 370/244 |
| 2008/0227410 A1 * | 9/2008 | Cox | ............ | 455/82 |
| 2008/0279288 A1 * | 11/2008 | Crawley et al. | ............ | 375/244 |
| 2009/0202022 A1 * | 8/2009 | Kaczman et al. | ............ | 375/319 |

OTHER PUBLICATIONS

Eugene F. Sartori, "Hybrid Transformers," IEEE Transactions on Parts, Materials and Packaging, vol. PMP-4, No. 3, Sep. 1968, pp. 59-66.

Hooman Darabi, "A Blocker Filtering Technique for SAW-LESS Wireless Receivers," IEEE Journal of Solid-State Circuits, vol. 42, No. 12, Dec. 2007, pp. 2766-2773.

Google—Digital Copy of a Book, Published by the American Institute of Electrical Engineers, "Transactions of the American Institute of Electrical Engineers," Jan. to Jun. 29, 1920, pp. 1-1077.

* cited by examiner

*Primary Examiner* — Andrew Wendell
(74) *Attorney, Agent, or Firm* — Garlick & Markison; Bruce E. Garlick

(57) ABSTRACT

A radio frequency (RF) transceiver front-end includes an antenna, an RF receiver section, an RF transmitter section, a balancing circuit, and a multiple node isolation and coupling circuit. The multiple node isolation and coupling circuit is coupled to the antenna, the RF receiver section, the RF transmitter section, and the balancing circuit. The multiple node isolation and coupling circuit provides an inbound RF signal from the antenna to the RF receiver section and provides an outbound RF signal from the RF transmitter section to the antenna, wherein, by providing an isolating signal to the balancing circuit, the multiple node isolation and coupling circuit substantially isolates the outbound RF signal from the inbound RF signal.

20 Claims, 6 Drawing Sheets

RF TRANSCEIVER FRONT-END WITH RX/TX ISOLATION

CROSS REFERENCE TO RELATED PATENTS

The present U.S. Utility Patent Application claims priority pursuant to 35 U.S.C. §119(e) to U.S. Provisional Patent Application Ser. No. 61/086,294, entitled "RF Transceiver Front-End With RX/TX Isolation", filed Aug. 5, 2008.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to radio frequency (RF) transceivers that operate in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many radio transceiver applications, the transmitter and receiver share an antenna. The sharing can be done in a half-duplex mode (i.e., one or the other is using the antenna) or a full-duplex mode (i.e., both can use the antenna at the same time). For the half-duplex mode, many transceivers include a transmit/receive switch that couples the transmitter or the receiver to the antenna.

For the full-duplex mode, the transmitter typically uses one carrier frequency in a given frequency band (e.g., 900 MHz, 1800 MHz, 1900 MHz, 2100 MHz, 2.4 GHz, 5 GHz, etc.) and the receiver uses another carrier frequency in the frequency band. Despite using different frequencies, the signal strength of the transmitted signal is significantly greater than that of the received signal (e.g., by as much as 100 dB). As such, the receiver is susceptible to interference from the transmitted signal. To contain the interference, transceivers include a duplexer, which utilize frequency selectivity to provide 50-60 dB of isolation between the transmitter and receiver. Duplexers, however, should be built with very low loss material, which cannot be done using silicon-based technology. As such, duplexers are fabricated using special materials and processes (e.g., ceramic, surface acoustic wave (SAW), film bulk acoustic wave (FBAR), etc.).

More recent implementations of full-duplex radio transceivers operate over multiple frequency bands (e.g., there are 11 frequency bands for WCDMA), which require a separate duplexer for each band. Each duplexer would be off-chip, increasing the size of the radio transceiver and its cost.

Therefore, a need exists for a duplexer functional circuit that can be fabricated using silicon-based technology such that it can be implemented on the same integrated circuit as the transceiver.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
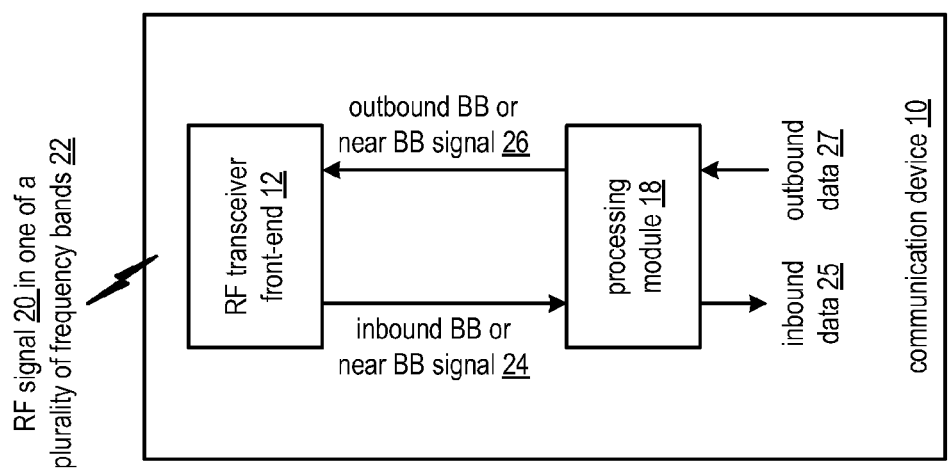
FIG. 1 is a schematic block diagram of an embodiment of a communication device in accordance with the present invention.

FIG. 1 is a schematic block diagram of an embodiment of a communication device 10 that includes a radio frequency (RF) transceiver front-end 12 and a processing module 18. The communication device 10 may be a cellular telephone, a personal digital assistant, a person media player (e.g., MP3 player), a laptop computer, a wireless local area network (WLAN) station, and/or any other device that transceives RF signals.

The processing module 18 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-9.

In operation, the RF transceiver front-end 12 receives and/or transmits RF signals 20 in one of a plurality of frequency bands (e.g., one or more of the 11 bands of WCDMA, 900 MHz, 1800 MHz, 1900 MHz, 2100 MHz, 2.4 GHz, 5 GHz, etc.). The RF transceiver front-end 12 converts an inbound RF signal into an inbound baseband (BB) or near baseband signal 24. The processing module 18 converts the inbound baseband or near baseband signal 24 (e.g., as a carrier frequency of DC or up to a few mega-Hertz) into inbound data 25 in accordance with one or more protocols (e.g., BPSK, QPSK, m-QAM, FSK, GMSK, etc.) of one or more standards (e.g., WCDMA, CDMA, GSM, IEEE 802.11, etc.).

The processing module 18 also converts outbound data 27 into an outbound baseband or near baseband signal 26 in accordance with the one or more protocols of the one or more standards. The RF transceiver front-end 12 converts the outbound baseband or near baseband signal 26 into an outbound RF signal using one of the frequency bands 22. Note that the inbound and outbound data 25 and 27 may be voice, graphics, audio, video, text, and/or a combination thereof.

Figure 2:
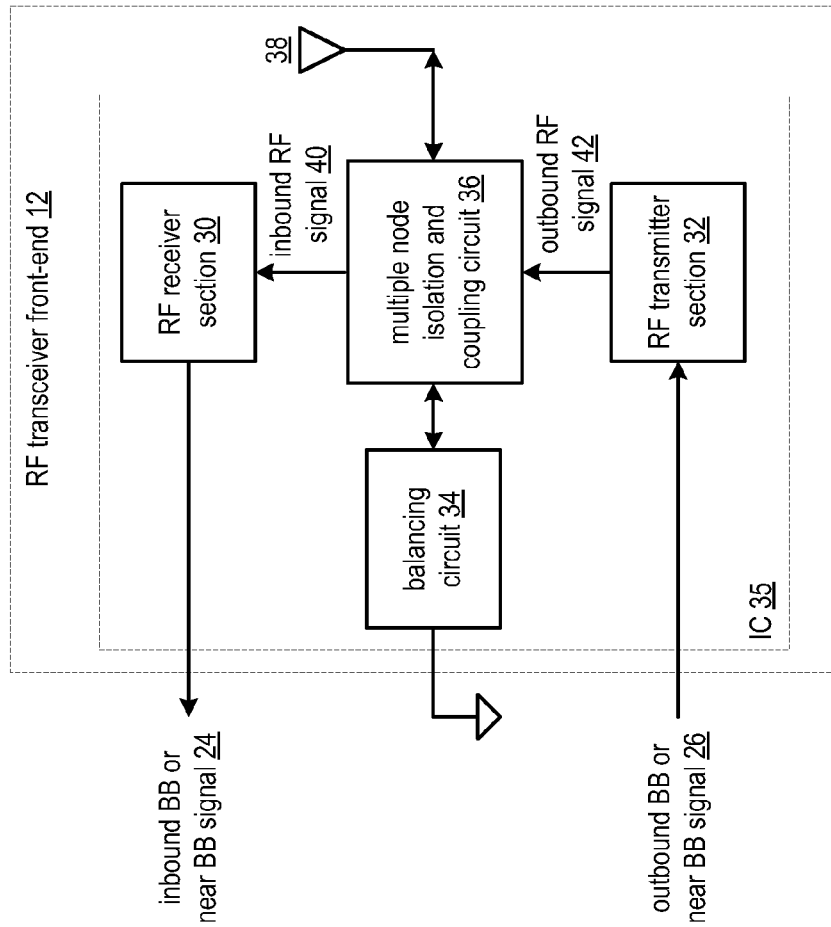
FIG. 2 is a schematic block diagram of an embodiment of an RF transceiver front-end in accordance with the present invention.

FIG. 2 is a schematic block diagram of an embodiment of an RF transceiver front-end 12 that includes an RF receiver section 20, an RF transmitter section 22, a balancing circuit 34, a multiple node isolation and coupling circuit 36, and an antenna 38. Note that the RF receiver section 20, the RF transmitter section 22, the balancing circuit 34, and the multiple node isolation and coupling circuit 36 may be implemented on an integrated circuit (IC) 35.

In operation, the RF receiver section 30, which includes one or more low noise amplifiers and a down conversion module, converts an inbound RF signal 40 (e.g., one of RF signals 20 of FIG. 1) into the inbound baseband or near baseband signal 24. The RF transmitter section 32, which includes an up-conversion module and one or more power amplifiers, converts the outbound baseband or near baseband signal 26 into an outbound RF signal 42 (e.g., one of RF signals 20 of FIG. 1).

The multiple node isolation and coupling circuit 36 (embodiments of which will be described in greater detail with reference to FIGS. 3-5) provides the inbound RF signal 40 from the antenna 38 to the RF receiver section 30 and provides the outbound RF signal 42 from the RF transmitter section 32 to the antenna 38. In addition, the multiple node isolation and coupling circuit 36 provides an isolating signal to the balancing circuit 34 such that the outbound RF signal 42 is substantially isolated (e.g., 35 dB or more) from the inbound RF signal 40. In general, the isolating signal is substantially equal to, but opposite, of the RF outbound RF signal 42 such that, at the input of the RF receiver section, the isolating signal substantially cancels the RF outbound RF signal 42.

Figure 3:
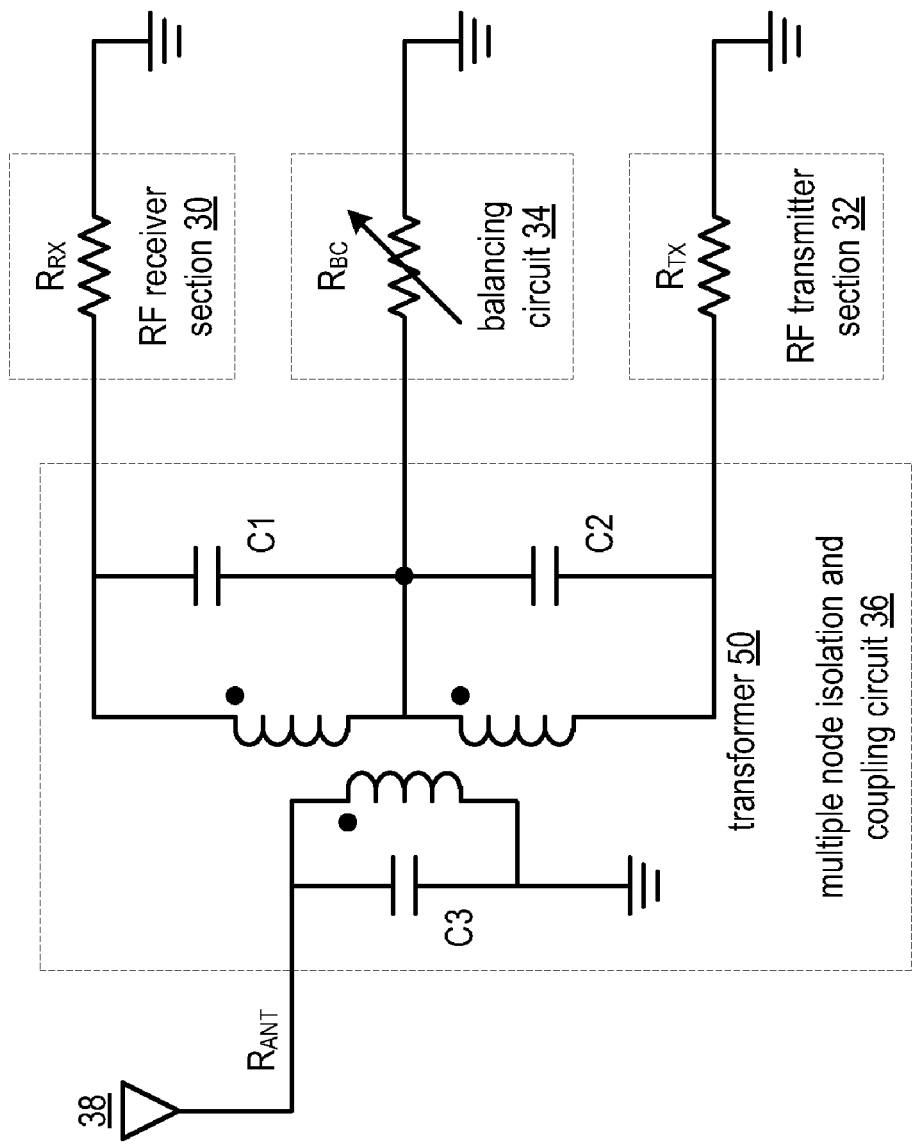
FIG. 3 is a schematic block diagram of another embodiment of an RF transceiver front-end in accordance with the present invention.

FIG. 3 is a schematic block diagram of another embodiment of an RF transceiver front-end 12 that includes the RF receiver section 30, the RF transmitter section 32, the balancing circuit 34, and the multiple node isolation and coupling circuit 35. In this embodiment, the multiple node isolation and coupling circuit 36 includes a transformer balun 50 and a plurality of capacitors C1-C3. Note that the capacitors may be omitted if the transformer 50 provides the desired frequency response within the various frequency bands.

The transformer balun 50 includes first, second, and third windings, where the antenna 38 is coupled to a node of the first winding, the RF receiver section 30 is coupled to a first node of the second winding, the RF transmitter section 32 is coupled to a second node of the third winding, and the balancing circuit 34 is coupled to a series connection of the second and third windings. The impedances of the RF receiver section 30, the RF transmitter section 32, and the balancing circuit 34 are shown as resistors $R_{RX}$, $R_{TX}$, and $R_{BC}$, respectively.

To provide the desired isolation between the RF receiver section 30 and the RF transmitter section 32, the node of first winding coupled to the antenna is conjugate with the node of the second and third windings coupled to the balancing circuit and the node of second winding coupled to the RF receiver section 30 is conjugate with the node of the third winding coupled to the RF transmitter section 32. For an ideal symmetrical transformer balun implementation, $R_{RX}$ equals R and $R_{TX}$ equals R. In addition, assume that the first winding and N2 turns and each of the second and third windings has N1 turns. Given these parameters, $R_{ANT}$ (impedance of antenna) should equal $R/2*[n2/n1]^2$ and $R_{BC}$ equals ½*R.

Figure 4:
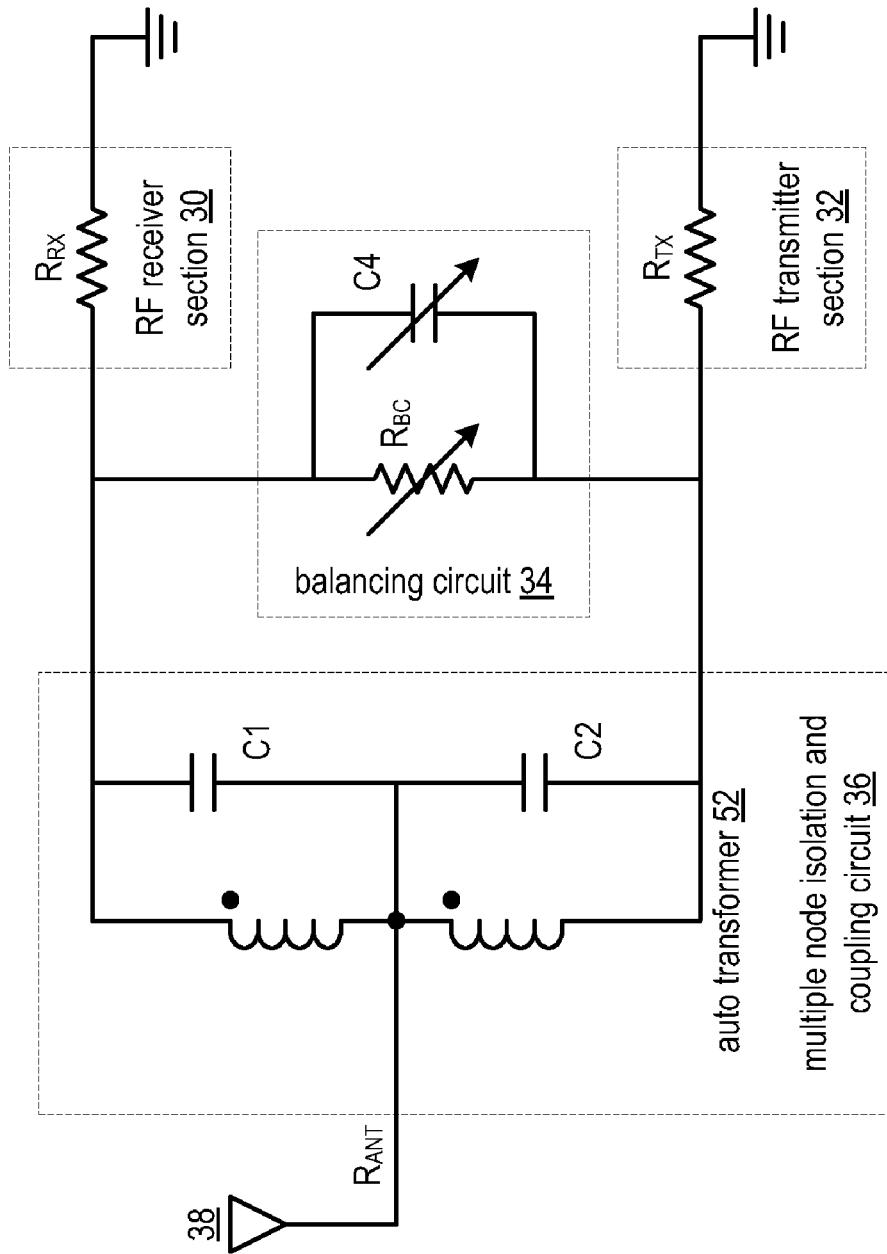
FIG. 4 is a schematic block diagram of another embodiment of an RF transceiver front-end in accordance with the present invention.

FIG. 4 is a schematic block diagram of another embodiment of an RF transceiver front-end 12 that includes the RF receiver section 30, the RF transmitter section 32, the balancing circuit 34, and the multiple node isolation and coupling circuit 35. In this embodiment, the multiple node isolation and coupling circuit 36 includes an auto transformer 52 and a plurality of capacitors C1-C2. Note that the capacitors may be omitted if the transformer 50 provides the desired frequency response within the various frequency bands.

The auto transformer 52 includes two windings, where the antenna 38 is coupled to the common node of the windings, the RF receiver section 30 is coupled to a first node of one the windings, the RF transmitter section 32 is coupled to a node of the other winding, and the balancing circuit 34 is coupled to the RF receiver section 30 and the RF transmitter section 32. The impedances of the RF receiver section 30, the RF transmitter section 32, and the balancing circuit 34 are shown as resistors $R_{RX}$, $R_{TX}$, and $R_{BC}$, respectively. In addition, the balancing circuit 34 includes a variable capacitor C4, which allows the circuit to be adjusted for various frequency bands of the communication device 10.

To provide the desired isolation between the RF receiver section 30 and the RF transmitter section 32, the impedance of the RF receiver section 30 should substantially equal the impedance of the RF transmitter section 32. In addition, the impedance of the balancing circuit should be about twice that of the RF transmitter section 32 and the impedance of the antenna should be about one-half of the impedance of the RF transmitter section 32. For example, in an ideal symmetrical autotransformer implementation $R_{RX}$ equals R and $R_{TX}$ equals R. In addition, assume that the first second windings have the same number of turns. Given these parameters, $R_{ANT}$ (impedance of antenna) should equal R/2 and RBC equals 2*R. For an asymmetrical implementation, $R_{RX}$ equals R and $R_{TX}$ equals k*R, such that $R_{BC}$ equals R*(1+k) and $R_{ANT}$ equals R*k/(k+1).

Figure 5:
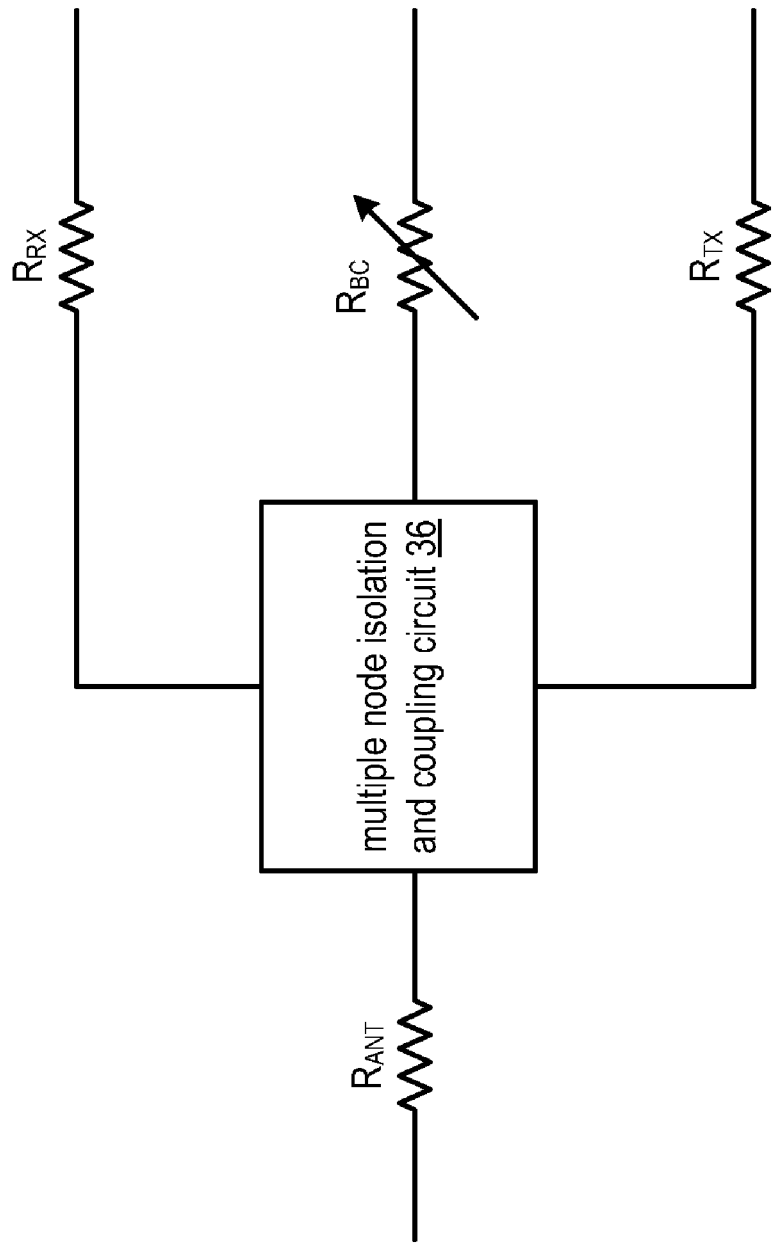
FIG. 5 is a diagram of an example of a multiple node isolation and coupling circuit in accordance with the present invention.

FIG. 5 is a diagram of an example of a multiple node isolation and coupling circuit 36 coupled to the impedances of the antenna 38, the RF receiver section 30, the RF transmitter section 32, and the balancing circuit 34. In this diagram, the desired level of isolation is provided when the current of the balancing circuit 34 substantially equals, but is opposite of the antenna current. In this regard, the current at the RF receiver section 30 is only the current of the received inbound RF signal.

Figure 6:
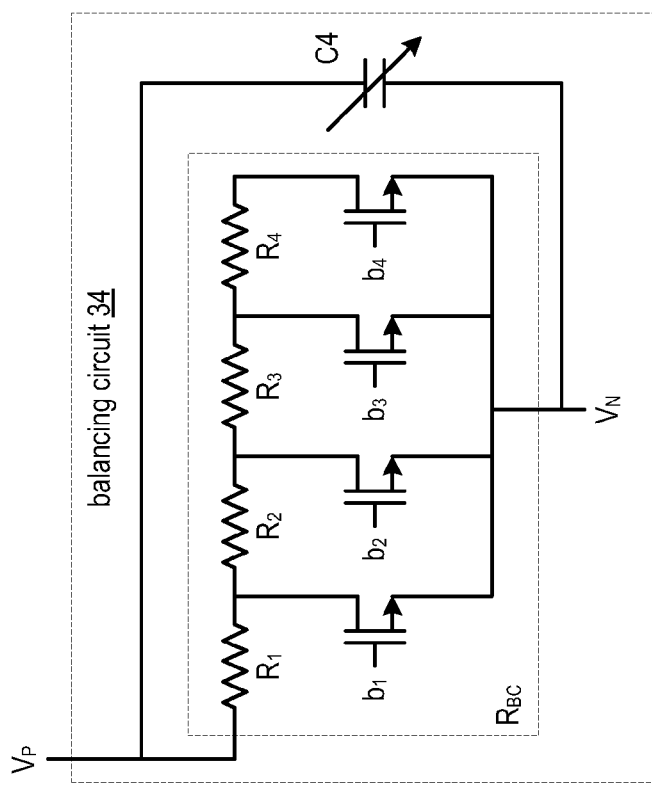
FIG. 6 is a schematic block diagram of an embodiment of a balancing circuit in accordance with the present invention.

FIG. 6 is a schematic block diagram of an embodiment of a balancing circuit 34 that includes a plurality of gateable resistors coupled in series. Input signals b1-b4 control the gating of the resistors to provide the desired impedance. Capacitor C4 is adjustable to tune the circuit to correspond to the frequency band currently being used by the communication device. In this manner, one on-chip circuit (verses numerous off-chip duplexers) can be used to provide a desired level of isolation in a full duplex, multiple frequency band transceiver.

Figure 7:
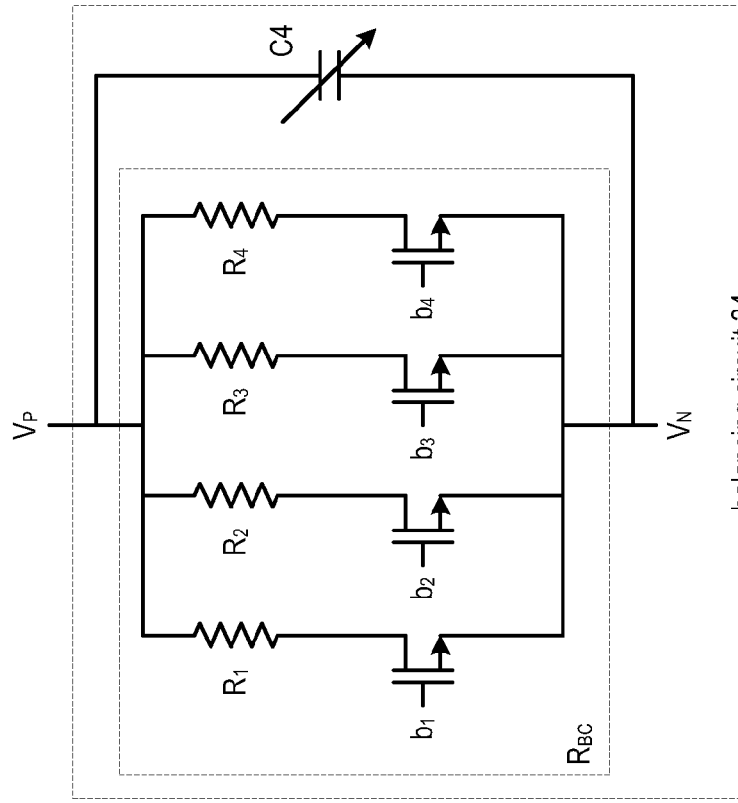
FIG. 7 is a schematic block diagram of another embodiment of a balancing circuit in accordance with the present invention.

FIG. 7 is a schematic block diagram of another embodiment of a balancing circuit 34 that includes a plurality of gateable resistors coupled in parallel. Input signals b1-b4 control the gating of the resistors to provide the desired impedance.

Figure 8:
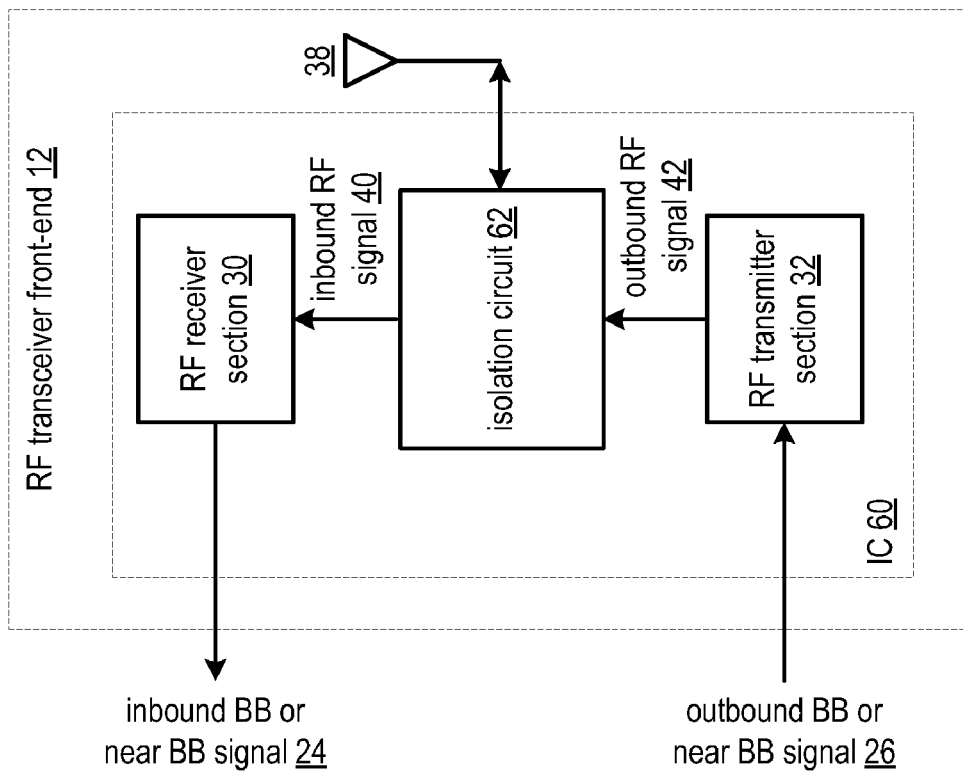
FIG. 8 is a schematic block diagram of another embodiment of an RF transceiver front-end in accordance with the present invention.

FIG. 8 is a schematic block diagram of another embodiment of an RF transceiver front-end 12 that includes an IC 60 and the antenna 36. The IC 60 includes the RF receiver section 30, the RF transmitter section 32, and an isolation circuit 62. The RF receiver section 30 converts an inbound RF signal 40 into an inbound baseband or near baseband signal 24 and the RF transmitter section 32 converts an outbound baseband or near baseband signal 26 into an outbound RF signal 42.

The isolation circuits 62, which may be a transformer as shown in FIG. 4 or 5, provides a path that carries a substantially equal but opposite current of the outbound RF signal 42 such that, at the RF receiver section 30, the substantially equal but opposite current of the outbound RF signal substantially cancels current of the outbound RF signal 42. Accordingly, the RF receiver section 30 is substantially isolated from the RF transmitter section 32. In an embodiment, an adjustable impedance network to provide a desired impedance of the balancing circuit with respect to impedances of the RF receiver section and the RF transmitter section. The path may further include an adjustable capacitor network coupled to the adjustable impedance network, wherein the adjustable capacitor network is adjusted to change an isolation frequency center of the isolation circuit.

Figure 9:
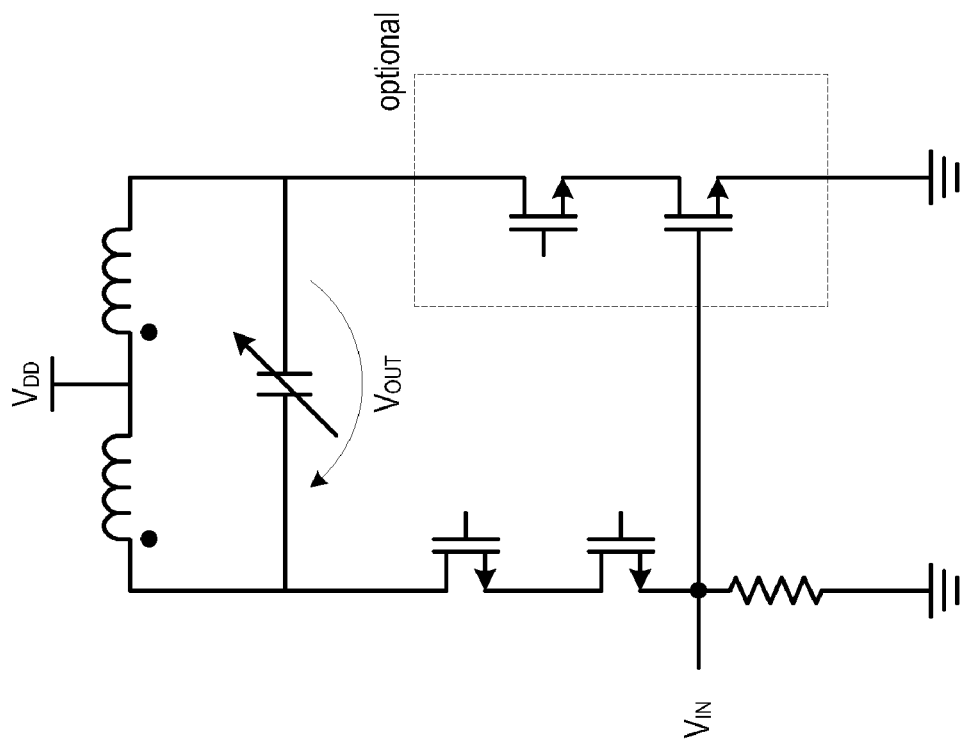
FIG. 9 is a schematic block diagram of an embodiment of low noise amplifier of the receiver section in accordance with the present invention.

FIG. 9 is a schematic block diagram of an embodiment of low noise amplifier of the receiver section 30. In one instance, the optional transistors may be removed.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transceiver front-end comprises:
    an antenna;
    an RF receiver section coupled to convert an inbound RF signal into an inbound baseband or near baseband signal;
    an RF transmitter section coupled to convert an outbound baseband or near baseband signal into an outbound RF signal;
    a balancing circuit; and
    a multiple node isolation and coupling circuit comprising a transformer balun having a first winding, a second winding, and a third winding, wherein: the second and third windings are serially coupled, wherein the antenna is coupled to a node of the first winding, the RF receiver section is coupled to a first node of the second winding, the RF transmitter section is coupled to a second node of the third winding, and the balancing circuit is coupled to a series connection of the second and third windings and a plurality of capacitors coupled to the first, second, and third windings,
    wherein the multiple node isolation and coupling circuit provides the inbound RF signal from the antenna to the RF receiver section and provides the outbound RF signal from the RF transmitter section to the antenna, wherein, by providing an isolating signal to the balancing circuit, the multiple node isolation and coupling circuit substantially isolates the outbound RF signal from the inbound RF signal.

2. The RF transceiver front-end of claim 1 further comprises:
    an integrated circuit (IC) the includes the RF receiver section, the RF transmitter section, the balancing circuit, and the multiple node isolation and coupling circuit.

3. The RF transceiver front-end of claim 1, wherein the RF receiver section and the RF transmitter section have substantially equal impedances within a frequency range and frequencies of the inbound and outbound RF signals are within the frequency range such that the transformer balun is a symmetrical transformer balun.

4. The RF transceiver front-end of claim 1, wherein, within a frequency range, impedance of the RF receiver section does not substantially equal impedance of the RF transmitter section and wherein frequencies of the inbound and outbound RF signals are within the frequency range such that the transformer balun is an asymmetrical transformer balun.

5. The RF transceiver front-end of claim 1, wherein the multiple node isolation and coupling circuit comprises:
    an autotransformer having a first winding and a second winding coupled in series, wherein a first node of the first winding is coupled to the RF transmitter section and to a first node of the balancing circuit, a second node of the second winding is coupled to the RF receiver section and to a second node of the balancing circuit, a series connection of a second node of the first winding to a first node of the second winding is coupled to the antenna; and
    a plurality of capacitors coupled to the first and second windings.

6. The RF transceiver front-end of claim 1, wherein the balancing circuit comprises:
    an adjustable impedance network to provide a desired impedance of the balancing circuit with respect to impedances of the RF receiver section and the RF transmitter section.

7. The RF transceiver front-end of claim 5, wherein the balancing circuit further comprises:
    an adjustable capacitor network coupled to the adjustable impedance network, wherein the adjustable capacitor network is adjusted to change an isolation frequency center of the multiple node isolation and coupling circuit.

8. The RF transceiver front-end of claim 1, wherein the RF receiver section and the RF transmitter section are operable to support cellular communications.

9. The RF transceiver front-end of claim 1, wherein the RF receiver section and the RF transmitter section are operable to support Wireless Local Area Network communications.

10. An integrated circuit (IC) comprises:
    an RF receiver section coupled to convert an inbound RF signal into an inbound baseband or near baseband signal;
    an RF transmitter section coupled to convert an outbound baseband or near baseband signal into an outbound RF signal;
    a balancing circuit; and
    a multiple node isolation and coupling circuit comprising a transformer balun having a first winding, a second winding, and a third winding, wherein: the second and third windings are serially coupled, wherein the antenna is coupled to a node of the first winding, the RF receiver section is coupled to a first node of the second winding, the RF transmitter section is coupled to a second node of the third winding, and the balancing circuit is coupled to a series connection of the second and third windings and a plurality of capacitors coupled to the first, second, and third windings, wherein the multiple node isolation and coupling circuit provides the inbound RF signal from the antenna to the RF receiver section and provides the outbound RF signal from the RF transmitter section to the antenna, wherein, by providing an isolating signal to the balancing circuit, the multiple node isolation and coupling circuit substantially isolates the outbound RF signal from the inbound RF signal.

11. The IC of claim 10, wherein the RF receiver section and the RF transmitter section have substantially equal impedances within a frequency range and frequencies of the inbound and outbound RF signals are within the frequency range such that the transformer balun is a symmetrical transformer balun.

12. The IC of claim 10, wherein, within a frequency range, impedance of the RF receiver section does not substantially equal impedance of the RF transmitter section and wherein frequencies of the inbound and outbound RF signals are within the frequency range such that the transformer balun is an asymmetrical transformer balun.

13. The IC of claim 10, wherein the multiple node isolation and coupling circuit comprises:

an autotransformer having a first winding and a second winding coupled in series, wherein a first node of the first winding is coupled to the RF transmitter section and to a first node of the balancing circuit, a second node of the second winding is coupled to the RF receiver section and to a second node of the balancing circuit, a series connection of a second node of the first winding to a first node of the second winding is coupled to the antenna; and a plurality of capacitors coupled to the first and second windings.

14. The IC of claim 10, wherein the balancing circuit comprises:

an adjustable impedance network to provide a desired impedance of the balancing circuit with respect to impedances of the RF receiver section and the RF transmitter section.

15. The IC of claim 14, wherein the balancing circuit further comprises:

an adjustable capacitor network coupled to the adjustable impedance network, wherein the adjustable capacitor network is adjusted to change an isolation frequency center of the multiple node isolation and coupling circuit.

16. The IC of claim 10, wherein RF transmitter and RF receiver section are operable to support cellular communications.

17. An integrated circuit (IC) comprises:

an RF receiver section coupled to convert an inbound RF signal into an inbound baseband or near baseband signal;

an RF transmitter section coupled to convert an outbound baseband or near baseband signal into an outbound RF signal; and an isolation circuit coupled to the RF receiver section and the RF transmitter section, wherein the isolation circuit provides a path comprising an adjustable capacitor network coupled to the adjustable impedance network, wherein the adjustable capacitor network is adjusted to change an isolation frequency center of the isolation circuit that carries a substantially equal but opposite current of the outbound RF signal such that, at the RF receiver section, the substantially equal but opposite current of the outbound RF signal substantially cancels current of the outbound RF signal.

18. The IC of claim 17, wherein the path comprises:

an adjustable impedance network to provide a desired impedance of the balancing circuit with respect to impedances of the RF receiver section and the RF transmitter section.

19. The IC of claim 17, wherein the isolation circuit comprises:

a transformer coupled to the RF receiver section, the RF transmitter section, and an antenna interface.

20. The IC of claim 17, wherein RF transmitter and RF receiver section are operable to support cellular communications.

* * * * *

UNITED STATES PATENT AND TRADEMARK OFFICE
CERTIFICATE OF CORRECTION

PATENT NO. : 8,208,866 B2  
APPLICATION NO. : 12/363486  
DATED : June 26, 2012  
INVENTOR(S) : Moyhee Mikhemar et al.

It is certified that error appears in the above-identified patent and that said Letters Patent is hereby corrected as shown below:

In the Claims

Col. 8, line 7, in claim 2: replace "circuit (IC) the" with --circuit (IC) that--

Signed and Sealed this  
Fourteenth Day of January, 2014

Michelle K. Lee  
*Deputy Director of the United States Patent and Trademark Office*